United States Patent

[11] 3,572,908

[72] Inventor Bernard Grolman
 Worcester, Mass.
[21] Appl. No. 809,526
[22] Filed Mar. 24, 1969
[45] Patented Mar. 30, 1971
[73] Assignee American Optical Corporation
 Southbridge, Mass.

[54] APPARATUS FOR MEASURING AND RECORDING REFRACTIVE ERRORS OF A PATIENT'S EYE
6 Claims, 7 Drawing Figs.

[52] U.S. Cl. ................................................ 351/6,
 351/7,13
[51] Int. Cl. ................................................ A61b 3/14,
 A61b 3/10
[50] Field of Search .......................................... 351/1, 6, 7,
 13, 15, 16

[56] References Cited
UNITED STATES PATENTS

| | | | |
|---|---|---|---|
| 1,613,658 | 1/1927 | Henker | 351/13X |
| 2,095,235 | 10/1937 | Ames, Jr. | 351/6X |
| 2,114,984 | 4/1938 | Reason | 351/6 |
| 2,586,973 | 2/1952 | McMillin | 351/7X |
| 3,016,000 | 1/1962 | Noyori | 351/7X |
| 3,259,039 | 7/1966 | Okajima | 351/7UX |
| 3,259,041 | 7/1966 | Okajima | 351/7UX |

OTHER REFERENCES

Campbell et al., JOSA, " High-Speed Infrared Optometer," Vol. 49, #3, pps. 268–272 3-1959, (351-6)

*Primary Examiner*—David Schonberg
*Assistant Examiner*—Paul A. Sacher
*Attorneys*—William C. Nealon, Noble S. Williams and Robert J. Bird

ABSTRACT: Apparatus for determining the refractive errors in a patient's eye while avoiding any impediment to normal binocular vision of the patient. Measurements of sphere, cylinder, and axis are accomplished without making use of subjective patient oral response and without stimulating uncontrolled accommodation by the patient, which accommodation would make the measurements inaccurate.

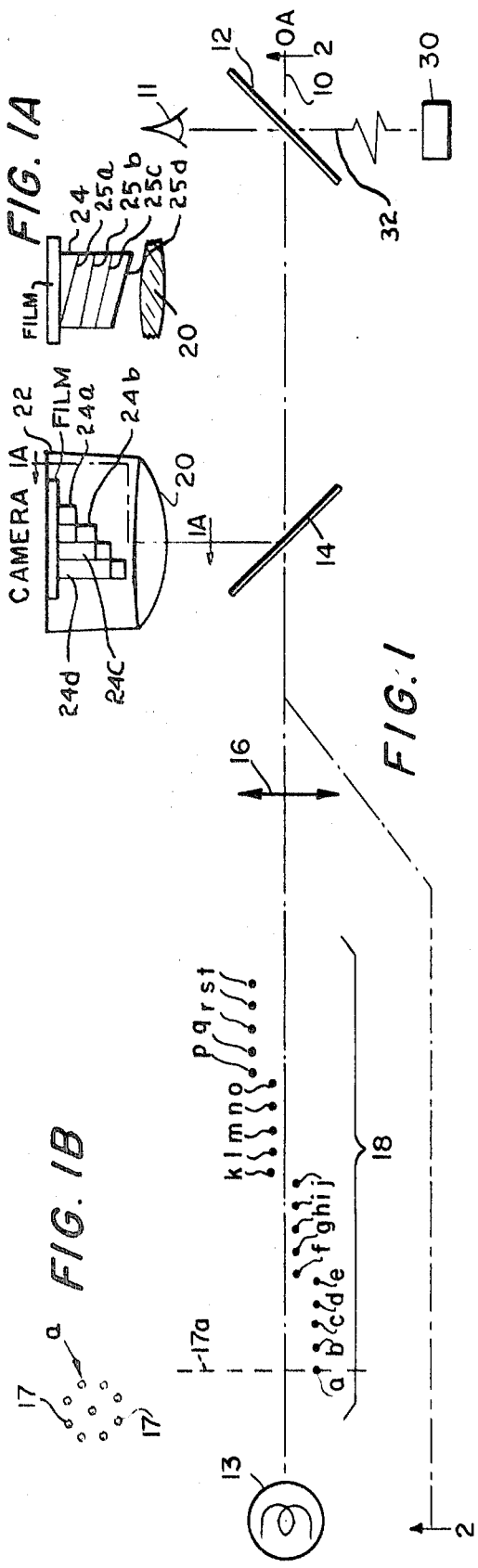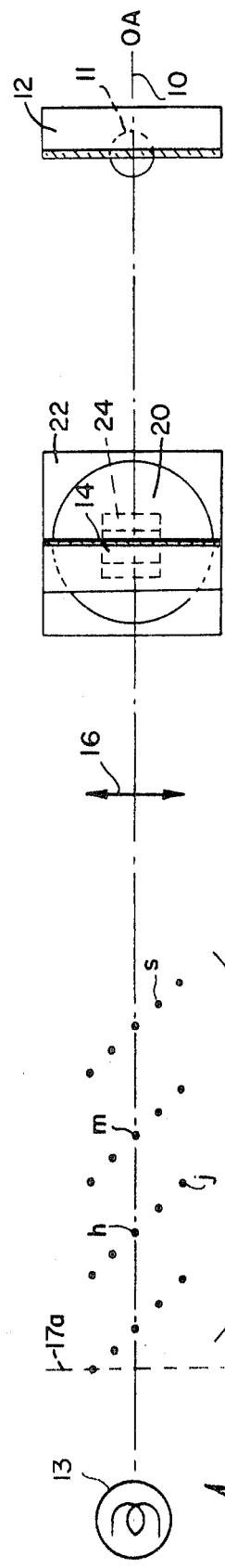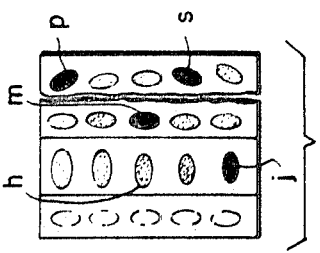

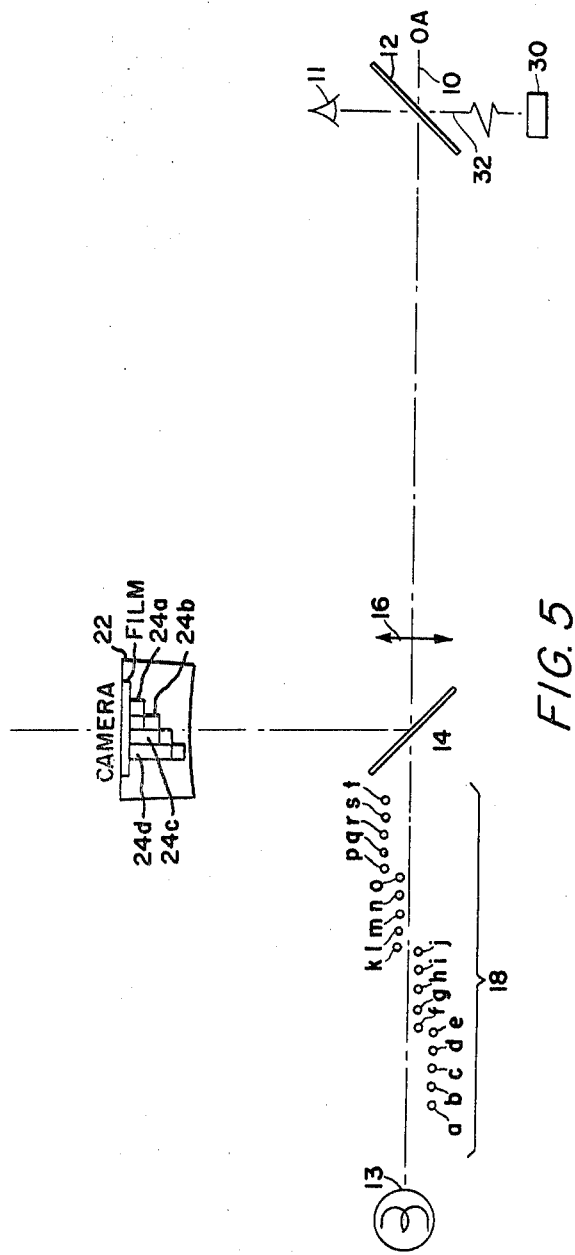
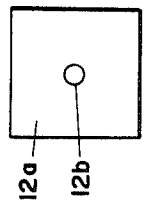

APPARATUS FOR MEASURING AND RECORDING REFRACTIVE ERRORS OF A PATIENT'S EYE

BACKGROUND OF THE INVENTION

1. Field of the Invention

The invention relates generally to refraction apparatus and more particularly to such apparatus which provides an objective measurement of refractive error rather than depending upon subjective patient oral response for determining that error.

2. Prior Art

Presently, refractive error measurement is accomplished generally by projecting an image onto the retina with apparatus including a variable focus system. That system is used to precisely focus the image and a measurement is taken of the amount of focusing which is necessary to accomplish the precise focusing. The systems presently used may be classified in two major categories: The first of these is the so-called "full pupil" method, wherein the image is both projected and observed using the full pupil of the patient. The problem that arises in this type of system is that the patient's cornea causes frontal reflection and the system also suffers from a usual drawback of present apparatus, the inducement of uncontrolled accommodation by the patient focusing upon the instrument. Also, the patient's awareness of the proximity of the instrument induces well-known unwanted "proximal accommodation." The second type of apparatus solves the problem of frontal reflection by using only a limited peripheral portion of the patient's pupil, that is, one discrete peripheral portion of the pupil is used to send in the image and another peripheral portion is used to view the image. However, a further problem is produced in this second type of apparatus in that the cornea is known to vary in refractive power across its surface and nonrelevant measurements are thereby caused to occur.

SUMMARY OF THE INVENTION

It is the object of the present invention to measure refractive error without any impediment to normal binocular vision and to utilize the entire pupil for taking the measurement, thereby to provide clinically pertinent data. The present invention provides refractive error measurement in an extremely short time duration (approximately one twenty-fifth of a second) to prevent ciliary muscle activity and troublesome eye motion. Also, the present apparatus provides a permanent recording of the refractive error determination.

Such objects and advantages are provided in an apparatus which features a target array having targets each being a known and fixed distance from each other and/or from a reference point such as the eye of the patient being refracted. The array is flashed for an extremely short time duration and projected in the field of vision of the patient being refracted. The retina is then observed and photographed to determine the most clearly focused target or targets, thereby to determine spherical or astigmatic correction, respectively, to be made in order to provide emmetropic vision by the patient being measured.

BRIEF DESCRIPTION OF THE DRAWINGS

Other objects, advantages, and embodiments of the present invention will be described in more detail by reference to the accompanying drawings wherein:

FIG. 1 is a diagrammatic plan view of a refractive error measuring and recording apparatus according to the present invention;

FIG. 1A is a fragmentary representation of means for providing film-retina conjugacy for every possible refractive error, such being a sectional view taken substantially upon the dot-dash section line 1A—1A in FIG. 1 and looking in the direction of the arrows;

FIG. 1B is a greatly enlarged representation of one form of single target element of FIG. 1 which may be used;

FIG. 2 is a diagrammatic sectional view of the apparatus of FIG. 1 taken substantially upon section line 2—2 thereof and looking in the direction of the arrows;

FIG. 3 is a fragmentary representation of parts of a sample retinagram produced by the apparatus of the present invention;

FIG. 4 is an elevational view of a modified form of beam splitter which may be used in FIG. 1; and FIG. 5 is a diagrammatic view similar to that of FIG. 1 but showing a modified form of the invention.

DESCRIPTION OF A PREFERRED EMBODIMENT

FIG. 1 shows a plan view representation of a refractive error measuring apparatus according to the present invention, which includes various parts arranged along and in relation to optical axis 10. The system comprises beam splitters 12 and 14, projection lens 16, and an array 18 of target elements $a$ through $t$. It may be seen from FIG. 1B that each of the target elements is preferably made up of a group of smaller elements 17 all of which lie in a common plane 17$a$ transversely disposed relative to axis 10. Thus, similar elements assist in determining and analyzing astigmatism induced ellipticity of any individual target element $a—t$ during the measurement. The apparatus further comprises a camera 22 including lens 20, and a means 24 for providing film-retina-target element conjugacy for every possible refractive error, without the person operating the apparatus knowing the error in advance of the measurement. One embodiment of this means 24 for providing such conjugacy is shown as an image field flattener in plan view in FIG. 1 and in side elevation as viewed from the right side in FIG. 1A. It is recommended that means 24 be in contact with the camera film for contact printing and that such means 24 be a fiber optics device comprising stepped bundles 24$a$, 24$b$, 24$c$ and 24$d$ having their front faces 25$a$, 25$b$, 25$c$ and 25$d$ sloping as shown for conjugacy and with all of the fibers at their rear ends coplanar and oriented perpendicular to the film surface.

The apparatus is operated by initiating a projection of the target array 18 in the field of vision of the patient's eye 11 and within a small angular subtend (5°—6°, for example) in order to avoid having parts of the images formed at peripheral parts of the retina. Such projection is accomplished by use of light source 13 and projection lens 16. The image of the target array thus formed jointly by the lens 16 and the lens of the eye is focused at or near the plane of the retina of the eye 11 by rays traveling through beam splitter 14 and after reflection from beam splitter 12 entering the eye. (This beam splitter 12 could be instead, as shown at 12$a$, in FIG. 4, a fully-reflecting mirror with a hole 12$b$ therein.) Thereafter, light reflected from the retina upon leaving the eye is reflected by beam splitters 12 and 14 to the camera lens 20. It is recommended, but not by way of limitation, that the primary focal point of the camera lens 20 be coincident with the primary focal point of the projection lens 16. Also, it is essential that the image plane for corneal reflection be far removed from the relevant target image planes, thereby avoiding any hindrance to the measurement due to frontal reflection.

After traveling through the camera lens, the retinal image is then reimaged on the film plane with each target element occupying a specific position in an array on the film, whether in focus or not.

The target array 18 is seen in side view in FIG. 2. In this view, it is seen how the target elements are separated from each other at fixed locations in a dimension different from that shown in FIG. 1. It should be understood that various possible target array arrangements are within the contemplation of the inventor as long as a sufficient separation is provided in one or more dimensions to accurately measure refractive error for one or more patients. A recommended axial incrementation of the target elements may be one-half of a diopter, or one-fourth of a diopter.

A film record provided by the apparatus of FIGS. 1 and 2 is shown in FIG. 3 with examples of the images recorded thereon and as viewed from the rear of the camera. If we assume that an array element $h$ lies in the focal plane of projection lens 16, we may then assume that to be our reference target element. That is, in an emmetropic eye, $h$ would image precisely in the plane of the retina. (It should be understood that no reference is actually needed in this system and is used hereby by way of example only.) If the only clearly focused target on the retina, and therefore on the retinagram, is $j$, (in FIG. 3), and $j$ is a known fixed distance from our reference $h$ or another reference, the number of diopters of spherical correction is then known by the distance between the projected $j$ and the reference. If both target elements $j$ and $m$ are clearly projected in focus, even though ellipticized, on the retina and therefore on the retinagram, it is known that a spherical correction determined by the distance between the projected target $h$ (or another reference) and the projected target $j$ is needed in addition to a cylindrical correction or astigmatic correction determined by the distance between the projections of targets $j$ and $m$. Likewise the patient's axis of astigmatism is determined by the difference between the orientation of targets $j$ or $m$, and a reference meridian. Further examples of reading the retinagram are possible using other examples, such as the clear focusing (even though they may be ellipticized) of either targets $p$ or $s$ as shown in FIG. 3, or, on the other hand, the clear focusing of both targets $p$ and $s$. (This is an example of difference in orientation.) Likewise, all other possible combinations, arrays, and target element arrangements are useful in the present invention apparatus.

An alternative embodiment of the arrangement is to use projection lens 16 as both the camera lens and the projection lens. This would be accomplished as shown in FIG. 5 by moving the beam splitter 14 to a position between the projection lens 16 and the array of target elements 18 and at the same time moving the camera and image field flattener apparatus 24 to an appropriate position relative to beam splitter 14.

It should also be understood that the position of the light source 13 with relation to the rest of the apparatus is determined by placing the light source behind the array so that its light travels through the projection lens and is then directed toward the pupil. The light source may be any one of a number of available systems such as a mercury arc light source system. It should also be mentioned that a quick developing camera apparatus is desirable in order to have immediate access to the retinagram for analysis and measurement. Furthermore, a fixation target 30 which is not necessarily a part of the apparatus would be provided, as shown in FIG. 1 upon the central line of sight 32 outwardly of the beam splitter 12 and at any distance desired by the doctor, in order to further insure that the patient has controlled accommodation during measurement.

Another embodiment, not shown in the drawings, would provide a built-in calibration for reading refractive error measurements by edge-lighting a reticle on the back face of the image field flattener.

A still further embodiment would be useful for persons having large refractive errors by providing an alignment system to insure a precise centration and distance between the patient's eye and beam splitter 12. Such a system would also insure dioptric calibration of array elements 18.

It should also be understood that the preferred embodiment includes a projection lamp that is either of the flashing type or shuttered.

I claim:

1. Apparatus for recording the refractive error measurements of a patient's eye, said apparatus comprising a light source, an array of target elements illuminated by said light source, first optical means including lens means for directing light rays from each of said target elements toward a predetermined eye-examination position of said apparatus one of said target elements serving as a reference target element for an emmetropic eye, said lens means having such a focal length and being so positioned as to have its focal plane coincident with said reference target element, each of said target elements being so differently located in the object field of and adjacent the optical axis of said lens means and so differently axially spaced from said lens means as to enable said lens means in conjunction with the lens of the patient's eye to tend to form images of said target elements at a plurality of different image planes in close proximity to the plane of the retina of said eye, whereby when any other target element is in focus upon the retina of the eye, the distance separating said other target element from said reference target element will be a function of the refractive error of the patient's eye, each of said target elements being located a predetermined known axial distance from an adjacent target element of said array, film means for receiving and recording light rays reflected from said retina, second optical means including lens means for directing said retina-reflected light rays toward said film means, and image field-flattener means having an exit surface disposed in contacting relation with said film means, and having a plurality of entrance surfaces disposed at such different optical distances respectively from said eye-examination position as to be in conjugate relation to said image planes at said eye position.

2. The invention according to claim 1 wherein said apparatus further comprises a fixation target to provide controlled accommodation of said eye.

3. The invention according to claim 1 wherein said image field-flattener is a fiber optics device having fibers oriented perpendicular to said film.

4. The invention according to claim 2 wherein said fixation target is in the line of sight of said eye and a mirror with a hole therein for allowing said target to be observed is disposed so as to direct reflection from said retina along a path at an angle to said line of sight.

5. The invention according to claim 1 wherein said apparatus includes a beam splitter between said first lens means and said eye-examination position for projecting the reflected light rays toward said field-flattener means.

6. The invention according to claim 1 wherein said apparatus includes a beam splitter between said first lens means and said array of target elements for projecting the reflected light rays to said field-flattener means.